No. 872,530. PATENTED DEC. 3, 1907.
G. H. MEEKER.
METHOD OF SEALING METAL IN GLASS.
APPLICATION FILED APR. 18, 1907.

WITNESSES:
Ella M. Ware
A. V. Groupy

INVENTOR
George H. Meeker,
BY
Walter C. Pusey.
ATTORNEY.

No. 872,530. PATENTED DEC. 3, 1907.
G. H. MEEKER.
METHOD OF SEALING METAL IN GLASS.
APPLICATION FILED APR. 18, 1907.

WITNESSES:
Ella M. Ware
A. V. Groupy

INVENTOR
George H. Meeker,
BY
Walter C. Pusey
ATTORNEY

UNITED STATES PATENT OFFICE.

GEORGE H. MEEKER, OF MEDIA, PENNSYLVANIA.

METHOD OF SEALING METAL IN GLASS.

No. 872,530.

Specification of Letters Patent.

Patented Dec. 3, 1907.

Application filed April 18, 1907. Serial No. 368,831.

*To all whom it may concern:*

Be it known that I, GEORGE H. MEEKER, citizen of the United States, and a resident of Media, Delaware county, State of Pennsylvania, have invented certain new and useful Improvements in Methods of Sealing Metal in Glass, of which the following is a full, clear, and exact description.

This invention relates to the sealing of oxidizable metals in glass in a manner to secure a tight joint between the metal and glass.

In carrying out my invention, as described in my Patent number 850,029, dated April 9th, 1907, I have discovered that there is at times an imperfect sealing of the metal within the glass, and an imperfect adhesion between the metal and the glass, due to the fact that during the sealing operation, when the metal and glass are brought together, that portion of the glass which is in actual contact with the metal is slightly chilled before the metal and glass assume the same temperature, the metal being of a lower temperature than the glass during the sealing operation; and due, further, to the fact that there are present, at times, minute quantities of gases between the metal and glass, thus preventing an actual contact of some parts of the metal with the glass.

The object of my present invention is to overcome, wholly or in part, the objections above mentioned, and to provide a novel method of sealing oxidizable metals in glass in a manner to prevent oxidization of the metal and to effect a more perfect adhesion between the metal and glass; and to exclude, wholly or in part, the gases from between the metal and glass, and to effect a very close contact or a more intimate association of the metal with the glass.

The oxidizable metal I would usually employ is a nickel steel or nickel iron, which can be produced having substantially the same coefficient of heat expansion and contraction as glass. As is well known, however, this metal rapidly oxidizes when subjected, in the presence of air, to the heat necessary for sealing the metal in the glass.

My invention is especially adapted for use in connection with the manufacture of incandescent electric lamp stems. In carrying out my present invention in this connection, I employ leading-in wires of oxidizable metal, and I heat the tubular glass stem to plastic condition and keep the wires cool by any suitable means or manipulation, such, for example, as the following:—I place said wires a suitable distance from and in suitable relation to the tubular glass stem to be applied to the lamp, and then subject the end of the stem to heat until it is brought to a plastic condition. This being done, the heating means is removed from the stem, or the stem is removed from the heating means, and the leading-in wires of oxidizable metal are brought to a position within the glass tube, or said tube is brought to a position inclosing the wires, the ends of the wires projecting the required distance from the tube. The plastic end of the glass tube or stem is now, by suitable manipulation, quickly squeezed upon said wires in a manner to inclose and embed the same therein before said wires have had opportunity to become heated to oxidizing temperature, thereby effecting a tight joint between the wires and the glass. After this has been done, the sealed end of the glass tube or stem and the wires embedded therein are reheated to a temperature that will cause a more perfect adhesion between the wire and glass; and during the reheating I subject one end of the embedded portion of the wire and the glass surrounding the same, to a vacuum or air exhaust: the vacuum or air exhaust drawing out from between the glass and wire embedded therein, wholly or in part, any gases that may be present, and at the same time drawing the plastic glass into closer contact with the wire. In addition to the last mentioned step of the process, and while the glass is in a plastic condition from the reheating thereof, I again squeeze the plastic glass upon the wire, and thus effect a still closer contact and a more perfect adhesion of the glass with the wire.

In the accompanying drawings, I have illustrated diagrammatically, my method as applied to the stem of an incandescent electric lamp.

Figure 3:
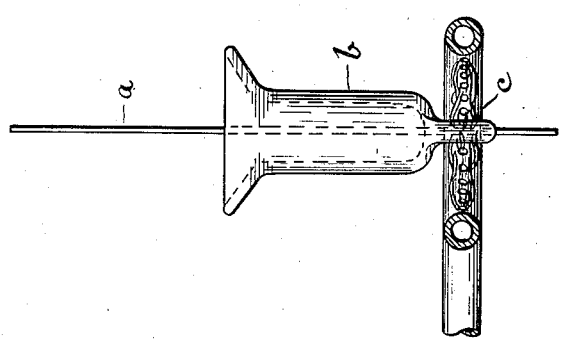
Fig. 3 shows the squeezed end of the stem and the wires embedded therein being reheated to cause a more perfect adhesion between the wires and the glass.
Figure 2:
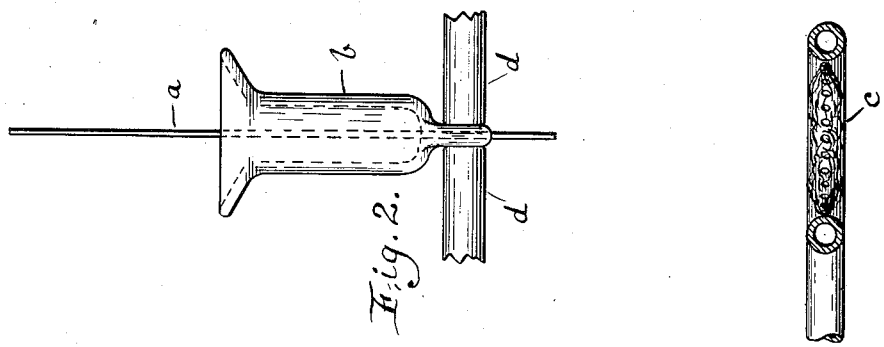
Fig. 2 shows the glass stem away from the burner and encompassing the wires, and the plastic end of the stem squeezed upon and embedding the wires therein by suitable devices, *d*, the parts being seen at right angles to Fig. 1.
Figure 1:
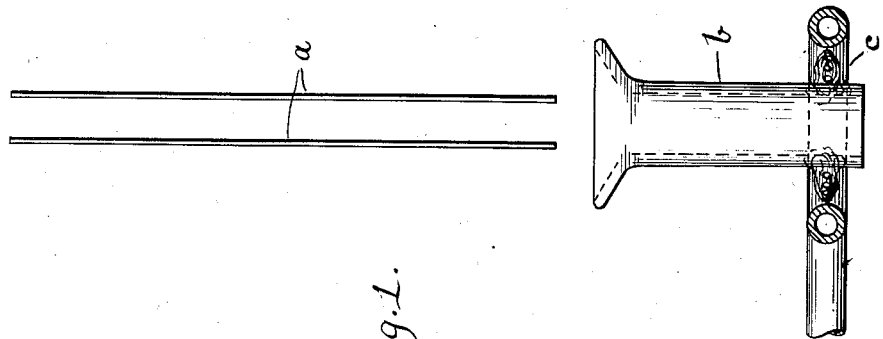
Figure 1 shows the wires, *a*, and the stem, *b*, a suitable distance from the wires, *a*, and adjacent a suitable burner, *c*, by means of which the stem is being heated to plastic condition.
Figure 4:
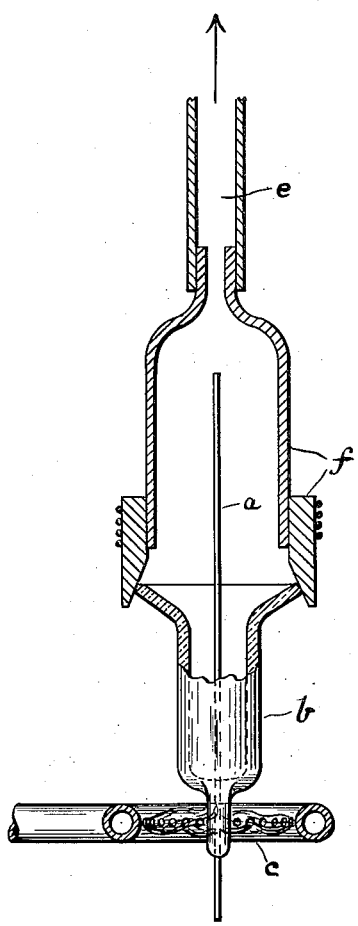

Fig. 4 shows one end of the embedded portion of the wires and the glass surrounding the same being subjected to a vacuum or air exhaust while the glass is in plastic condition from the reheating thereof, the vacuum or air exhaust drawing out, wholly or in part, from between the glass and the wires embedded therein any gases that may be present, and at the same time drawing the plastic glass into closer contact with the wires. To effect this step of the process, I connect the open end of the stem to the open end of a tube, e, leading to a suitable air exhausting or vacuum producing device, a suitable adapter, f, being employed to make the connection.

Figure 5:
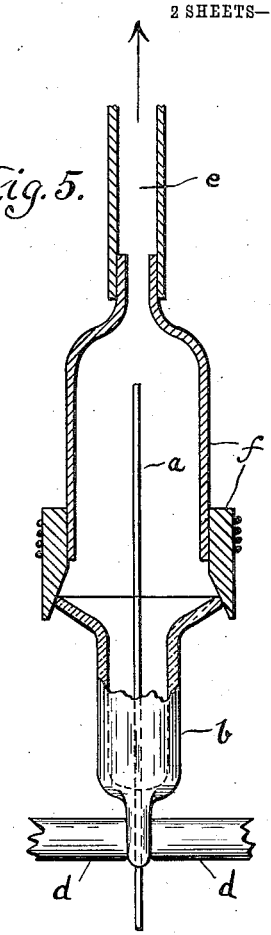

Fig. 5 shows the plastic glass being again squeezed upon the wires by suitable devices, d, after or during the reheating and air exhausting operation.

I desire it to be understood that, while my present invention is especially adapted for use in connection with the manufacture of incandescent electric lamp stems, it is useful for many other purposes; and further, I desire it to be understood that other oxidizable metals than the nickel steel or nickel iron may be employed in carrying out my process.

Having thus described my invention, I claim as new and desire to secure by Letters Patent:—

1. The process of sealing oxidizable metal within glass which consists in heating the glass to plastic condition without heating the metal to oxidizing temperature, and so quickly pressing the plastic glass around said metal that the metal will be sealed therein and the air substantially excluded therefrom before said metal has become heated to oxidizing temperature; and then reheating the glass and metal embedded therein, substantially as set forth.

2. The process of sealing oxidizable metal within incandescent lamp stems, which consists in heating a portion of the tubular stem to plastic condition without heating said metal to oxidizing temperature, and so quickly pressing the plastic portion of said stem together that the metal will be sealed therein and the air substantially excluded therefrom before said metal has become heated to oxidizing temperature; and then reheating the lamp stem and metal embedded therein, substantially as set forth.

3. The process of sealing oxidizable metal within incandescent lamp stems, said metal having substantially the same coefficient of heat expansion and contraction as the stem, which consists in heating a portion of the tubular stem to plastic condition at a point away from said metal, bringing the tubular stem to position inclosing said metal, and pressing the plastic portion of the stem together, embedding said metal therein before they have become heated to oxidizing temperature; and then reheating the tubular stem and metal embedded therein, substantially as set forth.

4. The process of sealing oxidizable metal within glass which consists in heating the glass to plastic condition without heating the metal to oxidizing temperature, and so quickly pressing the plastic glass around said metal that the metal will be sealed therein and the air substantially excluded therefrom before said metal has become heated to oxidizing temperature; then reheating the glass and metal embedded therein, and subjecting one end of the embedded portion of the metal and the glass surrounding the same to a vacuum or air exhaust, substantially as set forth.

5. The process of sealing oxidizable metal within incandescent lamp stems which consists in heating a portion of the tubular stem to plastic condition without heating said metal to oxidizing temperature, and so quickly pressing the plastic portion of said stem together that the metal will be sealed therein and the air substantially excluded therefrom before said metal has become heated to oxidizing temperature; then reheating the lamp stem and metal embedded therein, and subjecting one end of the embedded portion of the metal and the stem surrounding the same to a vacuum or air exhaust, substantially as set forth.

6. The process of sealing oxidizable metal within incandescent lamp stems, said metal having substantially the same coefficient of heat expansion and contraction as the stem, which consists in heating a portion of the tubular stem to plastic condition at a point away from said metal, bringing the tubular stem to a position inclosing said metal, and pressing the plastic portion of the stem together, embedding said metal therein before it has become heated to oxidizing temperature; then reheating the tubular stem and metal embedded therein, and subjecting one end of the embedded portion of the metal and the stem surrounding the same to a vacuum or air exhaust, substantially as set forth.

7. The process of sealing oxidizable metal within glass which consists in heating the glass to plastic condition without heating the metal to oxidizing temperature, and so quickly pressing the plastic glass around said metal that the metal will be sealed therein and the air substantially excluded therefrom before said metal has become heated to oxidizing temperature; then reheating the glass and metal embedded therein, and repressing the reheated glass upon the metal, substantially as set forth.

8. The process of sealing oxidizable metal within incandescent lamp stems which consists in heating a portion of the tubular stem to plastic condition without heating said metal to oxidizing temperature, and so quickly pressing the plastic portion of said stem together that the metal will be sealed therein and the air substantially excluded therefrom before said metal has become heated to oxidizing temperature; then reheating the lamp stem and metal embedded therein, and repressing the heated stem upon the metal, substantially as set forth.

9. The process of sealing oxidizable metal within incandescent lamp stems, said metal having substantially the same coefficient of heat expansion and contraction as the stem, which consists in heating a portion of the tubular stem to plastic condition at a point away from said metal, bringing the tubular stem to position inclosing said metal, and pressing the plastic portion of the stem together, embedding said metal therein before it has become heated to oxidizing temperature; then reheating the tubular stem and metal embedded therein, and repressing the reheated stem upon the metal, substantially as set forth.

10. The process of sealing oxidizable metal within glass which consists in heating the glass to plastic condition without heating the metal to oxidizing temperature, and so quickly pressing the plastic glass around said metal that the metal will be sealed therein and the air substantially excluded therefrom before said metal has become heated to oxidizing temperature; then reheating the glass and metal embedded therein, subjecting one end of the embedded portion of the metal and the glass surrounding the same to a vacuum or air exhaust, and repressing the reheated glass upon the metal, substantially as set forth.

11. The process of sealing oxidizable metal within incandescent lamp stems, which consists in heating a portion of the tubular stem to plastic condition without heating said metal to oxidizing temperature, and so quickly pressing the plastic portion of said stem together that the metal will be sealed therein and the air substantially excluded therefrom before said wires have become heated to oxidizing temperature; then reheating the lamp stem and metal embedded therein, subjecting one end of the embedded portion of the metal and the stem surrounding the same to a vacuum or air exhaust, and repressing the reheated stem upon the metal, substantially as set forth.

12. The process of sealing oxidizable metal within incandescent lamp stems, said metal having substantially the same coefficient of heat expansion and contraction as the stem, which consists in heating a portion of the tubular stem to plastic condition at a point away from said metal, bringing the tubular stem to a position inclosing said metal, and pressing the plastic portion of the stem together, embedding said metal therein before it has become heated to oxidizing temperature; then reheating the tubular stem and metal embedded therein, subjecting one end of the embedded portion of the metal and the stem surrounding the same to a vacuum or air exhaust, and repressing the reheated stem upon the metal, substantially as set forth.

In testimony whereof, I have hereunto affixed my signature.

GEORGE H. MEEKER.

Witnesses:
   A. O. WINCHESTER,
   A. V. GROUPE.